P. A. RODGERS.
EGG BOILER.
APPLICATION FILED MAY 31, 1917.
1,272,318.
Patented July 9, 1918.
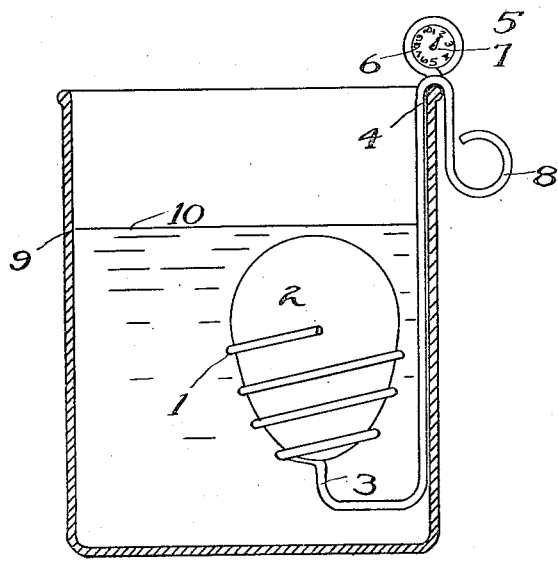
Inventor:
Peter A. Rodgers
by C. D. Enochs
Attorney.

UNITED STATES PATENT OFFICE.

PETER A. RODGERS, OF PROCTOR, MINNESOTA.

EGG-BOILER.

1,272,318.

Specification of Letters Patent.

Patented July 9, 1918.

Application filed May 31, 1917. Serial No. 172,094.

*To all whom it may concern:*

Be it known that I, PETER A. RODGERS, a citizen of the United States, and a resident of Proctor, in the county of St. Louis and State of Minnesota, have invented certain new and useful Improvements in Egg-Boilers, of which the following is a specification.

One object of my invention is to provide a frame work that may be readily suspended in a vessel of boiling water so as to expose the eggs carried in the frame work to the heat of the water.

Another object of my invention is to provide improved means for attaching an egg boiler to the side of a vessel containing the boiling water.

Another object of my invention is to provide means for attaching the egg boiler to a cup or glass so the egg may be eaten directly from the shell while contained in the egg boiler.

Another object of my invention is to provide with an egg boiler, an indicator showing the minutes the egg has been, or is to be, boiled.

With these and incidental objects in view, the invention consists of certain novel features of construction and combination of parts, the essential elements of which are hereinafter described with reference to the drawing which accompanies and forms a part of this specification.

The drawing discloses a side elevation of my improved egg boiler attached to the wall of a cooking vessel, shown in section.

In the construction shown, a single piece of wire 1 is formed into a shape suitable to retain an egg 2 therein, and the free end of the wire carried from the point 3 upwardly to form a hook 4 for suspension over the edge of a cup or vessel.

The wire at 4 may be twisted into a ring 5 in which is carried a dial 6, having a rotatable hand 7 that may be set to the numerals printed on the dial.

The extreme end of the wire is formed into a finger hold 8 so the egg boiler may be readily removed from the water to a cup or glass, from which it is hung while the egg is being eaten.

The dimensions are preferably such that when the egg boiler is suspended in a vessel 9 with the water level at 10 the egg is entirely submerged, and also that when the hook 4 is placed over the edge of a tumbler, the egg 2 is readily accessible for eating directly from the shell.

While I have described my invention and illustrated it in one particular design, I do not wish it understood that I limit myself to this construction, as it is evident that the invention may be varied in many ways within the scope of the following claim.

Claim:

As an article of manufacture an egg boiler formed of a single piece of wire, one portion of which is shaped into an egg receptacle, an upstanding projection from said egg receptacle formed into a hook adapted to engage the edge of a cooking vessel or tumbler to support the egg boiler therein, a finger grip in the extreme end of the outer side of said hook and a dial carrying ring formed in the wire above said hook.

PETER A. RODGERS.